United States Patent [19]

Scholz

[11] Patent Number: 4,854,824
[45] Date of Patent: Aug. 8, 1989

[54] VAPOR SEPARATING AND METERING PUMP

[75] Inventor: Daniel E. Scholz, Avon, Ohio

[73] Assignee: Parker-Hannifin Corporation, Cleveland, Ohio

[21] Appl. No.: 150,800

[22] Filed: Feb. 1, 1988

[51] Int. Cl.$^4$ ............................................. F04C 19/00
[52] U.S. Cl. ................................................... 417/69
[58] Field of Search .................. 417/68, 69, 85, 199.1, 417/199.2; 418/181, DIG. 1

[56] References Cited

U.S. PATENT DOCUMENTS

| | | | |
|---|---|---|---|
| 2,850,983 | 9/1958 | Adams | 417/69 |
| 2,952,214 | 9/1960 | Adams | 417/69 |

*Primary Examiner*—Leonard E. Smith
*Attorney, Agent, or Firm*—Ralph E. Jocke

[57] ABSTRACT

A two-staged vapor separating and metering fuel pump for an aircraft includes a housing (12) divided into a liquid ring section, a metering section and a motor section. Vapor-laden fuel enters the liquid ring section through a fuel inlet opening (14) and enters a liquid ring chamber (36) wherein vapor is separated from the fuel by the rotary action of a liquid ring impeller (44). The separated vapor is discharged from the housing through a vapor outlet opening (18). Vapor-free liquid from the liquid ring section is delivered to a metering chamber (86). The action of a metering rotor (72) in the metering chamber causes fuel to be discharged from the metering section at a flow rate proportional to the rotational speed of the metering rotor. The metering section discharges fuel from a pair or outlet ports (94) into a cavity (114) in the motor section. The motor section includes an armature (104) which is connected to a shaft (46) on which the metering and liquid ring impellers are mounted. Fuel discharged from the metering portion passes through the cavity cooling the components located in the motor section, and is discharged from the housing through a housing outlet opening (16). A sensor (116) mounted adjacent the liquid ring impeller generates signals representative of the rotational displacement of the shaft which are representative of the quantity of fuel discharged from the pump. The signals from the sensor are transmitted to a fuel control system of the aircraft which operates to adjust the rotational speed of the armature to deliver a desired amount of fuel at the outlet of the pump.

23 Claims, 10 Drawing Sheets

VAPOR SEPARATING AND METERING PUMP

TECHNICAL FIELDS

This invention relates to fuel pumps for aircraft and missile applications. Particularly, this invention relates to apparatus for pumping vapor laden fuel, separating the vapor and delivering liquid fuel at a controlled rate to an engine.

BACKGROUND ART

Dissolved vapor in aircraft and missile fuels may pose serious problems. If the vapor begins evolving when the vehicle is in flight, it may interrupt or stall the engine. This problem is particularly severe in drones or missiles in which the fuel may be stored in a sealed tank on the vehicle for an extended period before use If excessive vapor is present at engine start-up, the vehicle may fail to start or may stall.

The only prior system of which applicant is aware, which attempts to minimize the problems associated with dissolved vapor in fuel is one which utilizes the use of three separate devices. This system requires a tank mounted booster pump. The booster pump supplies vapor laden fuel to a separator tank. In the separator tank, the vapor is allowed to boil out of the liquid and the liquid phase is supplied to the suction side of a metering pump. The metering pump delivers the fuel at a controlled rate to the engine.

A problem with existing systems is that they are expensive due to the use of multiple components. In addition, the two pumps in such systems consume large amounts of power and add weight; two very undesirable characteristics for lightweight vehicles Increasing the number of interdependent components in a fuel system also increases the probability of failure.

Thus, there exists a need for a vapor separating and fuel metering apparatus for an aircraft or missile that is lightweight, compact and uses less power than apparatus currently in use. There further exists a need for a vapor separating and fuel metering apparatus that reliably functions regardless of acceleration forces on the vehicle.

DISCLOSURE OF INVENTION

It is an object of the present invention to provide an apparatus for separating vapor and supplying fuel in metered amounts to an engine of an aircraft that is compact and lightweight.

It is a further object of the present invention to provide an apparatus for separating vapor and supplying fuel in metered amounts to an engine of an aircraft that requires less power for its operation.

It is a further object of the present invention to provide an apparatus for separating vapor and supplying fuel in metered amounts to an engine of an aircraft that performs the vapor separation and fuel metering functions within a single unit.

It is a further object of the present invention to provide an apparatus for separating vapor and supplying fuel in metered amounts to an engine of an aircraft that does not require fuel to be delivered to the apparatus at positive pressure and which apparatus can be mounted at any location in the fuel line between a fuel supply tank and the engine.

It is a further object of the present invention to provide an apparatus for separating vapor and supplying fuel in metered amounts to an engine of an aircraft that will operate effectively regardless of vertical orientation or acceleration.

It is a further object of the present invention to provide an apparatus for separating vapor and supplying fuel in metered amounts to an engine of an aircraft that is more reliable and less expensive.

Further objects of the present invention will be made apparent in the following description of the Best Modes For Carrying Out The Invention and the appended claims.

The foregoing objects are accomplished by a vapor separating and metering fuel pump which includes a housing divided into a motor section, a liquid ring section and a metering section. The motor section encloses a rotatable armature which is connected to a shaft extending transversely into the liquid ring and metering sections.

The liquid ring section includes an oval shape liquid ring chamber. A radial-vaned, liquid ring impeller is positioned in the liquid ring chamber and is rotatable with said shaft. Vapor laden fuel from a supply enters an inlet opening in the housing and is directed into the liquid ring chamber through an inlet port. The centrifugal action of the liquid ring impeller causes the fuel to form a liquid ring which forces the vapor to separate out of the fuel. The vapor collects near the axis of rotation of the liquid ring impeller, is discharged from an outlet port in the liquid ring chamber and is then conducted through a vapor outlet opening in the housing The vapor is directed back to the fuel supply tank. The liquid free fuel collects in the liquid ring chamber near the outer wall away from the axis of rotation of the impeller.

The vapor free fuel is ducted from the liquid ring chamber through dividing walls inside the housing into the metering section. The metering section includes a circular metering chamber. The vapor free fuel enters the metering chamber through two inlet passages. A three-lobed metering impeller rotor is mounted for rotation in the metering chamber on the common shaft with the liquid ring impeller. Extending portions of the lobes of the metering rotor are in close proximity to the wall of the chamber. There are openings between the lobes of the metering rotor which hold metered quantities of fuel. A pair of opposed sealing vanes extend inward from the walls of the metering chamber. The sealing vanes are biased toward the interior of the chamber by a spring clip and the faces of the sealing vanes ride on the outer surface of the metering rotor.

The inlet passages deliver the vapor free fuel into the metering chamber proximate to the sealing vanes. The inlet passages are positioned just beyond the vanes in a first rotational direction. A pair of metered fuel outlets carry metered fuel discharged from the metering chamber. The metered fuel outlets are positioned in the metering chamber just ahead of the sealing vanes in the first rotational direction. Thus, the openings between the lobes of the metering rotor admit a fixed quantity of fuel to the metering chamber each time an opening passes an inlet passage and discharges the metered quantity as each opening passes an outlet.

The outlets from the metering chamber deliver fuel through a dividing wall inside the housing to a cavity in the motor section. The metered fuel passing through the motor section cools the armature and other components which make up the motor. The metered fuel then passes out of the cavity in the motor section through a fuel outlet port in the housing. From the fuel outlet port, the fuel is delivered to a fuel line leading to the engine.

A rotation sensor is mounted in the housing and generates signals representative of the rotational speed of the shaft. As each rotation of the shaft corresponds to the delivery of a known quantity of fuel from the metering section, a fuel control system of the aircraft, missile or other vehicle on which the pump is installed, can calculate the quantity of fuel being delivered to the engine. The fuel control system operates to adjust the rotational speed of the armature so the quantity of fuel delivered by the fuel pump matches the amount of fuel required by the control system.

BEST MODES FOR CARRYING OUT THE INVENTION

Figure 1:
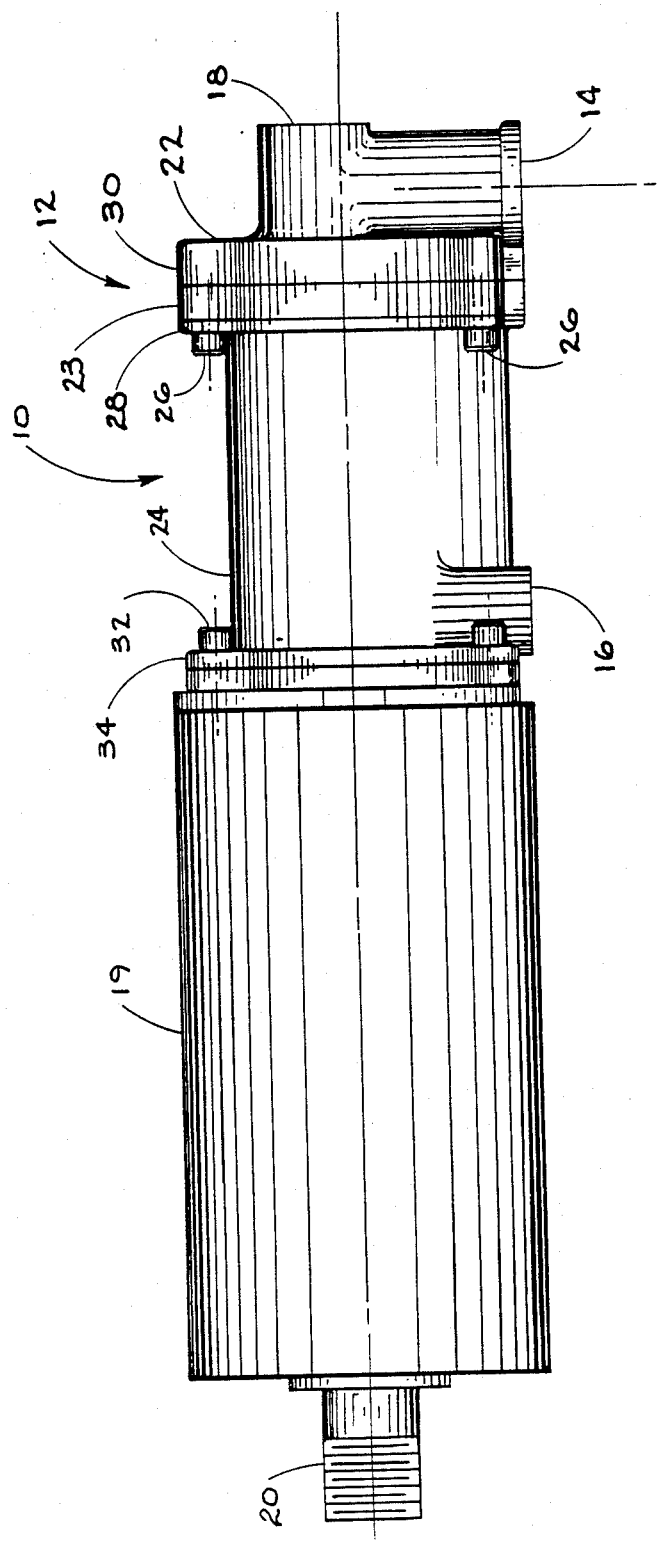
FIG. 1 is a top view of the vapor separating and metering fuel pump of the preferred embodiment of the present invention.
Figure 2:
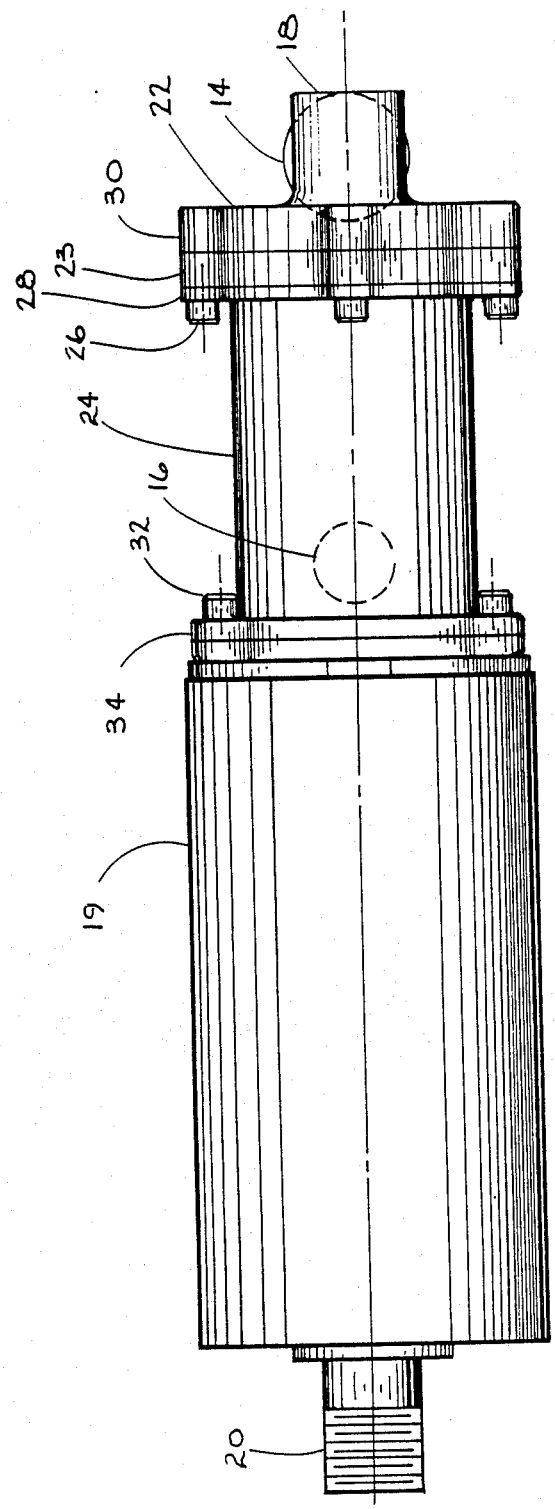
FIG. 2 is a right side view of the pump shown in FIG. 1.
Figure 3:
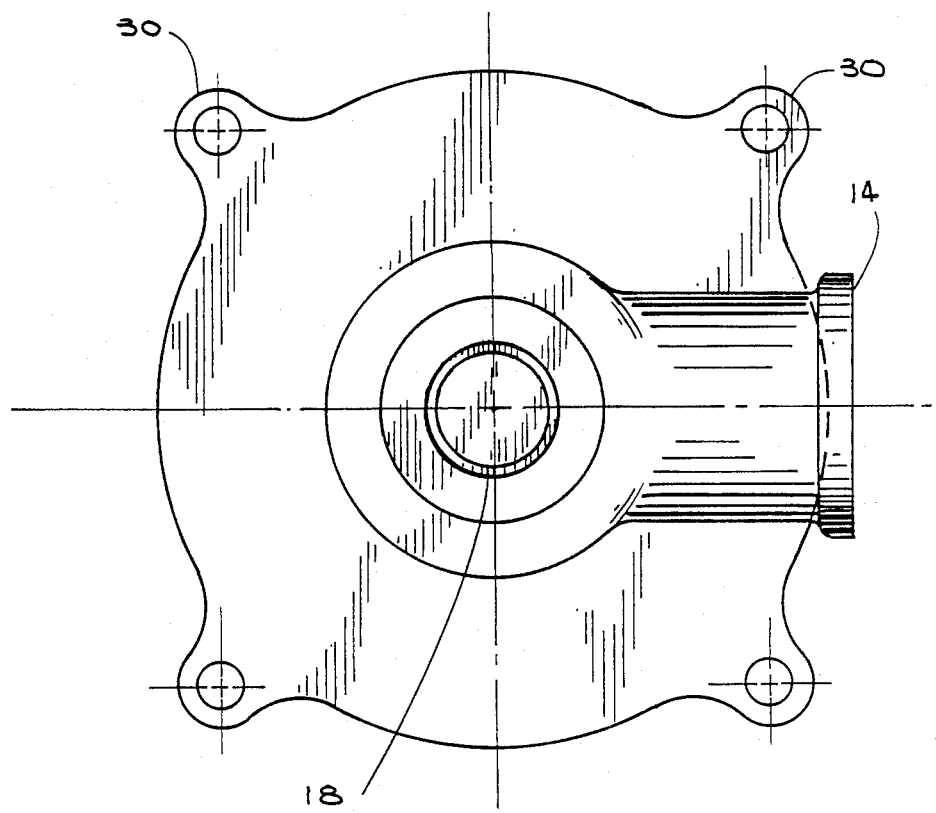
FIG. 3 is an inlet end view of the pump shown in FIG. 1.

Referring now to the drawings and particularly to FIG. 1 there is shown therein the preferred form of a vapor separating and fuel metering pump of the present invention generally indicated 10. The pump includes a housing 12. Housing 12 incorporates a fuel inlet opening 14 for admitting vapor laden fuel from a fuel supply tank to the housing as well as an outlet opening 16 for discharging metered vapor-free fuel to a fuel line leading to an engine of the aircraft, missile or other vehicle on which the pump is installed. The housing also includes a vapor outlet opening 18 for delivering vapor which is separated from the fuel by the pump. In the preferred form of the invention, the vapor is returned to the fuel supply tank through a fuel line.

Attached to housing 12 is a motor control enclosure 19 which encloses electrical apparatus associated with control of the motor section of the pump as later explained. The motor control enclosure includes an electrical connector 20 which connects the pump to the remainder of an electronic control system for the vehicle. The electronic control system is responsible for controlling the amount of fuel delivered to the engine.

Housing 12 includes an end cap portion 22, an intermediate portion 23 and an elongated portion 24 which are held adjacent by fasteners 26. Fasteners 26 extend through ears 28 on the elongated portion, through intermediate portion 23, and thread into tabs 30 on the cap portion. Elongated portion 24 is attached to the motor control enclosure 19 by fasteners 34 extending through ears 34 on the elongated portion of the housing.

Figure 4:
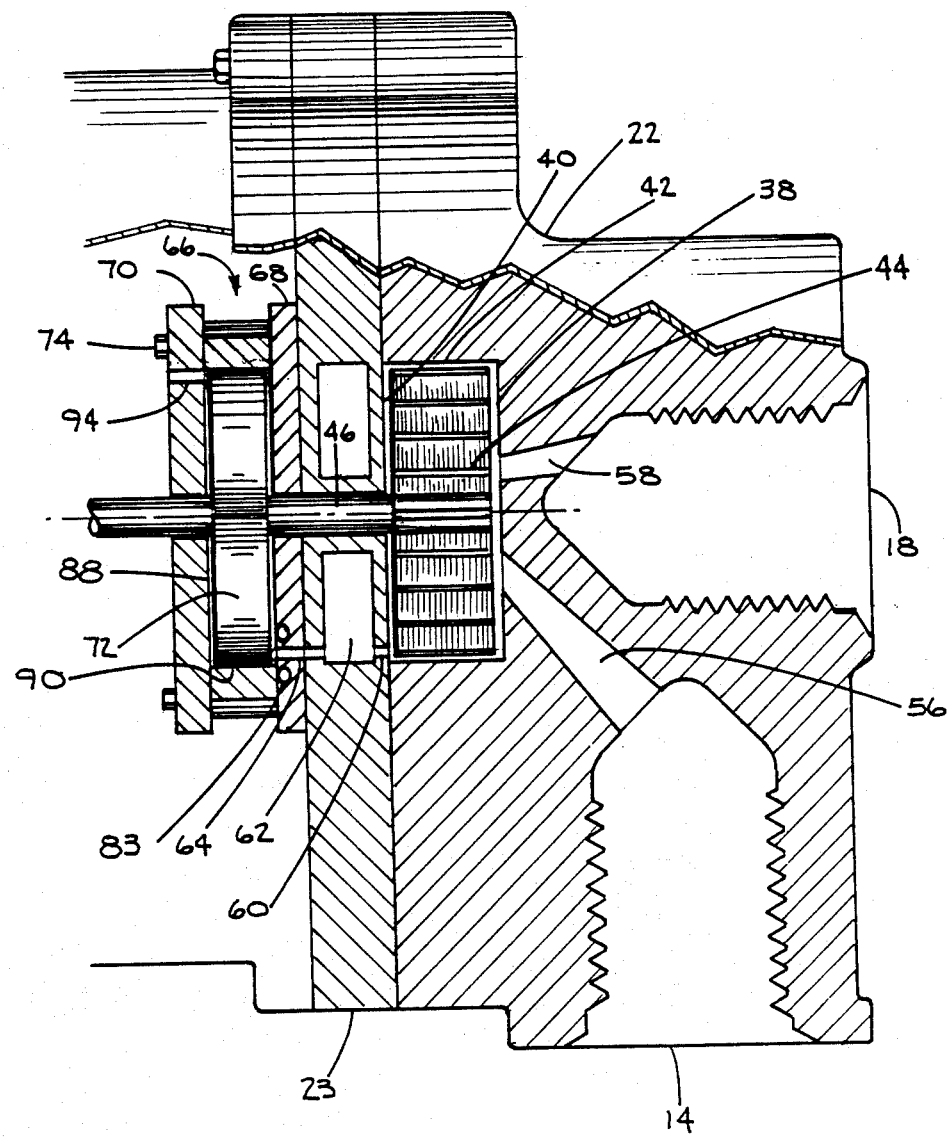
FIG. 4 is a longitudinal and cross sectional view of the liquid ring and metering sections of the pump.
Figure 5:
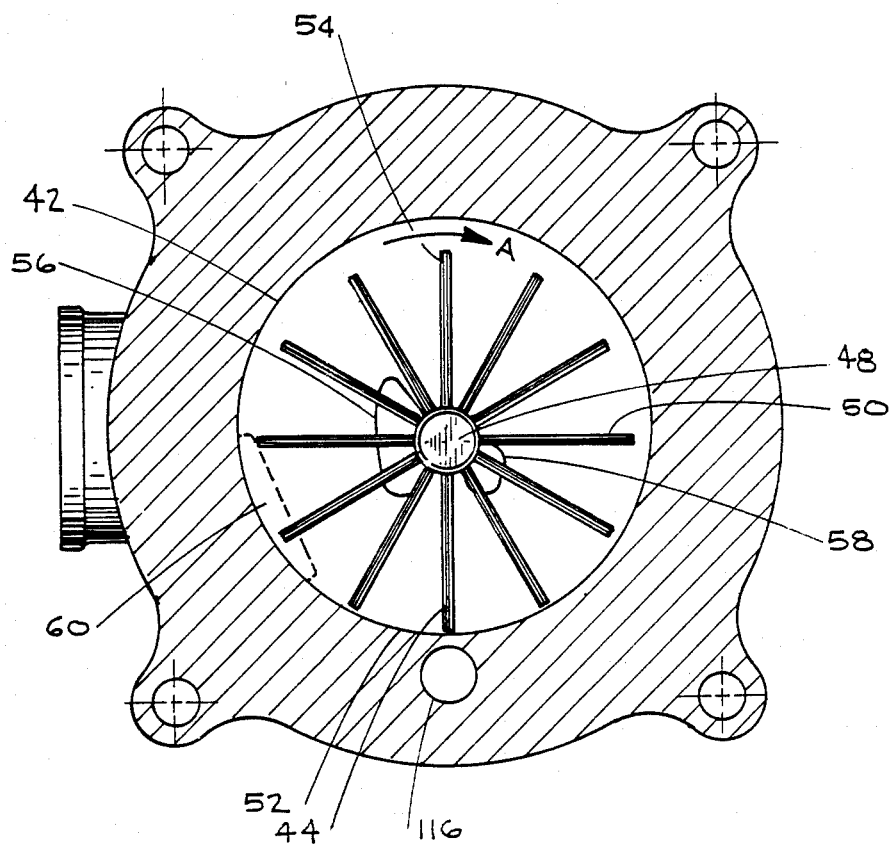
FIG. 5 is a lateral cross sectional view of the liquid ring section of the pump.

The interior of housing 12 is divided into three sections: a liquid ring section, a metering section and a motor section. A cross sectional view of the liquid ring and metering sections is shown in FIG. 4. End cap 22 has therein a liquid ring chamber generally indicated 36. Liquid ring chamber 3 is bounded at a first end by a planar wall 38, and at an opposed end by a planar wall 40 which is a lower face of intermediate portion 23. The liquid ring chamber is bounded at the sides by a contour wall 42. As shown in FIG. 5, the shape of the liquid ring chamber is an oval in cross section.

A liquid ring impeller 44 is mounted on a shaft 46 and is rotatable therewith. Impeller 44 includes a hub portion 48 which accepts shaft 46 and a plurality of vanes 50 radially extending from the hub portion. Impeller 44 is mounted in liquid ring chamber 36 such that when the impeller rotates in the direction of arrow A in FIG. 5, the outer tips of the vanes pass closer to contour wall 42 at a first location 52 and are disposed away from the wall until reaching a maximum distance at a second location 54.

A fuel inlet port 56 admits vapor laden fuel into the liquid ring chamber. The fuel inlet port introduces the fuel between the hub of the impeller and the tips of the vanes and in a hemisphere of the liquid ring chamber through which the vanes pass as they move in the direction of arrow A from the first to the second locations. Inlet port 56 in the preferred embodiment is elongated and kidney shaped.

A vapor outlet port 58 in the liquid ring chamber is in fluid connection with the vapor outlet opening 18. Vapor outlet port 58 is located close to hub 48 and between the second and first locations of the vanes as the impeller rotates in the direction of arrow A.

Shaft 46 is journaled in a mounting hole in intermediate portion 23 and is in close tolerance therewith to prevent the escape of liquid from the liquid ring chamber around the shaft. A liquid outlet port 60 extends through face 40 of intermediate portion 23 and opens into a cavity 62. As shown in phantom in FIG. 5, outlet port 60 is elongated and positioned adjacent contour wall 42 between the first and second locations.

Figure 7:
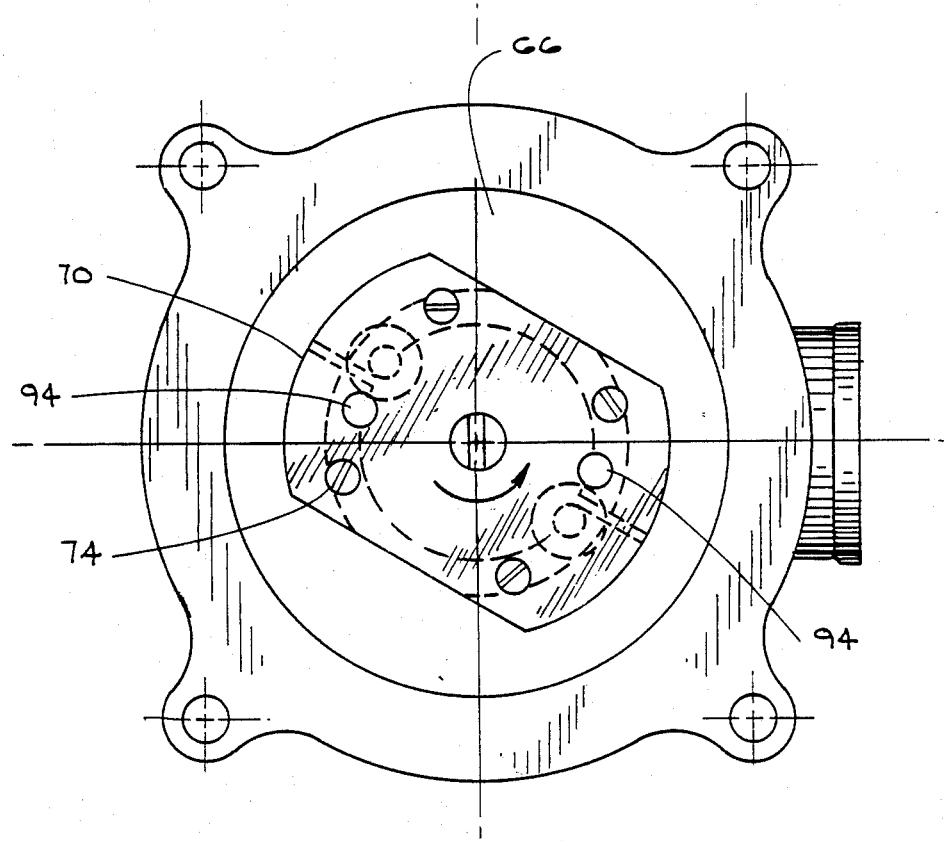
FIG. 7 is a top end view of the metering section of the pump.

Cavity 62 in intermediate portion 23 is connected to a pair of cavity outlet ports 64 (only one of which is shown is shown in FIG. 4) which deliver liquid fuel into the metering section of the pump generally indicated 66. Metering section 66 includes a lower plate 68 and an upper body 70. Plate 68 and body 70 enclose a three-lobed metering impeller or rotor 72 (see FIG. 8) which is mounted on shaft 46. Metering section 66 is held adjacent intermediate portion 23 by fasteners 74 as shown in FIG. 7. Metering section 66 is sized to fit inside elongated portion 24 of housing 12 when the pum is assembled.

Figure 9:
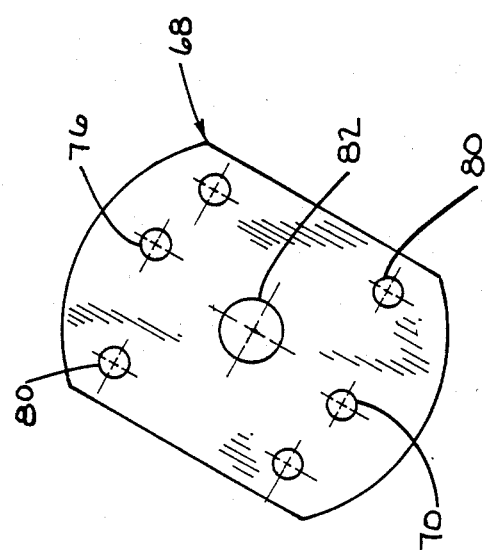
FIG. 9 is a bottom end view of the lower plate of the metering section of the pump.

Lower plate 68 of metering section 66 includes a pair of liquid inlet ports 76 (see FIG. 9) as well as four access holes 80 which provide access for fasteners 74. Lower plate 68 also includes a central access hole which enables shaft 46 to pass therethrough, but which prevents liquid from leaking around the shaft. A pair of o-rings 83 are positioned in recesses in intermediate portion 23 to prevent leakage as fuel passes from cavity outlet ports 64 to inlet ports 76. In other embodiments, it may be possible to eliminate lower plate 68 and to mount upper body 70 directly to intermediate portion 23.

Figure 8:
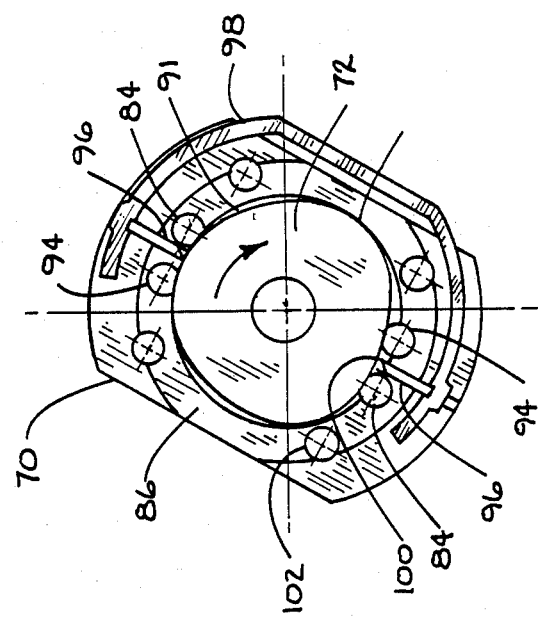
FIG. 8 is a bottom end view of the metering chamber and metering impeller of the pump.

As shown in FIG. 8, positioned in upper body 70, above inlet ports 76 in plate 68, are a pair of blind inlet passages 84. Passages 84 open into a circular metering chamber 86 which is bounded by the upper surface of plate 68, a surface 88 in upper body 70, and a laterally extending wall 90. Three-lobed, metering rotor 72 is cam shaped and includes extending portions 92 which are in close tolerance with lateral wall 90. The face of metering rotor 72 is a limacon curve which enhances its performance as later explained. The upper and lower surfaces of the metering rotor are also in close tolerance with the upper and lower surfaces which define metering chamber 86. Between the extending portions 92 of the metering rotor inside the metering chamber, are openings 91. Openings 91 function as repositories for metered amounts of fuel as later explained.

A pair of outlet ports 94 extend from circular metering chamber 86 out the top of upper body 70. A pair of opposed sealing vanes 96 are mounted for radial movement in upper body 70 and are biased towards metering impeller 72 by a C-shaped spring clip 98. Sealing vanes 96 terminate in tapered portions 100 which ride on the contoured outer surface of metering rotor 72. Upper body 70 also includes access holes 102 which provide access for fasteners 74 which extend therethrough.

During operation of the vapor separating and metering pump, vapor laden fuel enters housing inlet opening 14 and passes through port 56 into the liquid ring chamber. The rotation of liquid ring impeller 44 causes the liquid to be forced outward toward contour wall 42 in the liquid ring chamber. This centrifugal action causes the vapor to separate out of the liquid and to be compressed against the hub 48 of the impeller. The separated vapor is forced out of the liquid ring chamber through vapor outlet port 58 and is exhausted from the housing through vapor outlet opening 18. From vapor outlet opening 18, the vapor is delivered back to the fuel supply tank.

Vapor free liquid is forced out of the liquid ring chamber through liquid outlet port 60 and into chamber 62. The liquid then enters blind inlet passage 84 of the metering section through inlets 76 in plate 90. As lobed rotor 72 rotates with shaft 46, fuel fills openings 91 between the extending portions 92 of the rotor as the openings pass inlet passages 84. The fuel in the openings 91 is carried around the metering chamber by rotor 72 until forced to pass out of the metering chamber through outlet ports 94 by sealing vanes 96. As each opening carries a predetermined quantity of vapor free fuel, the quantity of fuel delivered at outlets 94 is directly proportional to the rotational speed of the metering rotor.

An advantage of forming the surface of rotor 72 as a limacon curve is that sealing vanes 96 are smoothly accelerated in the radial direction. Conventional metering rotors in which the faces of the lobes are flattened would cause the vanes to experience irregular accelerations which would result in fatigue or failure of the vanes.

Figure 6:
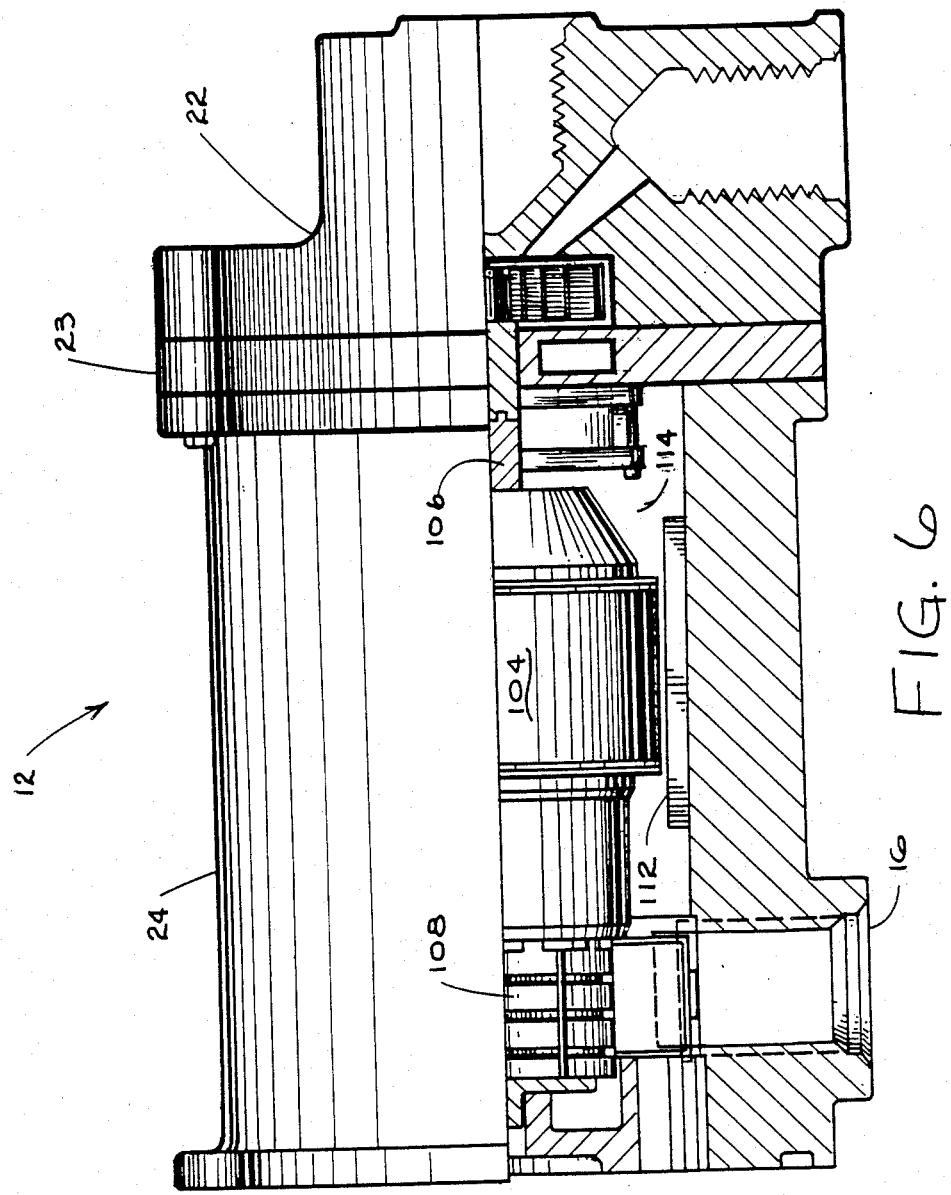
FIG. 6 is a partially sectioned view of the motor, metering and liquid ring sections of the pump.
Figure 10:
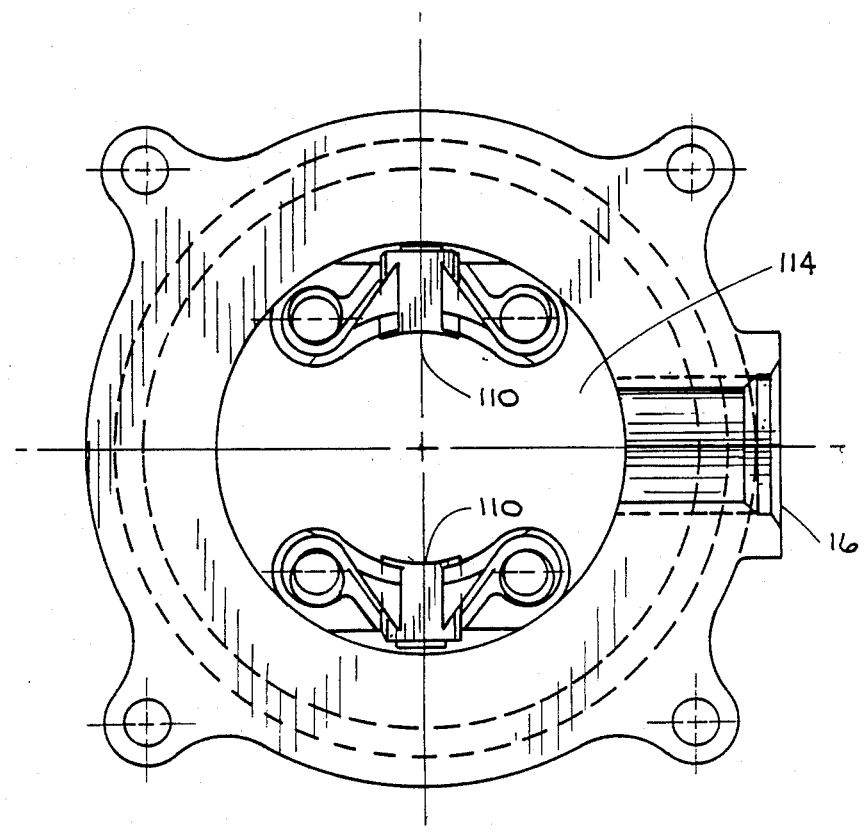
FIG. 10 is a top end sectional view of the motor section of the pump.

As shown in FIG. 6, elongated portion 24 of housing 12 encloses a motor armature 104 which is rotatable in bearing means (not shown). Armature 104 is connected to shaft 46 through a stub shaft 106. Armature 104 includes a commutator portion 108 which is in electrical contact with a pair of spring loaded brushes 110 (see FIG. 10). Permanent magnets 112 are positioned adjacent armature 110. When electricity is supplied to the brushes from the circuitry in the motor control portion 19 of the housing, the armature rotates and drives the liquid ring impeller 44 and metering rotor 72.

The interior of elongated portion 24 includes a liquid tight internal cavity 114. Liquid from outlet ports 94 of the metering section is discharged into cavity 114 and passes over the components comprising the motor to provide cooling. The metered fuel then exits from cavity 114 through housing outlet opening 16.

A further feature of the preferred embodiment of the present invention is that a magnetic sensor 116 is positioned adjacent liquid ring impeller 44 in cap portion 22 (see FIG. 5). Because impeller 44 is made of material having magnetic properties, sensor 116 senses the passage of each vane and generates a signal representative thereof. As the liquid ring impeller is positively connected to metering rotor 72 by shaft 46, the signals generated by sensor 116 are representative of the quantity of fuel being discharged by the metering portion of the pump. A fuel control system of the vehicle uses the signals from sensor 116 to calculate the fuel flow being delivered by the pump to the engine and compares this to the flow rate desired by the system. If a different fuel flow rate is required, the rotational speed of the armature is either increased or decreased to adjust the amount of fuel being delivered by the pump.

Figure 11:
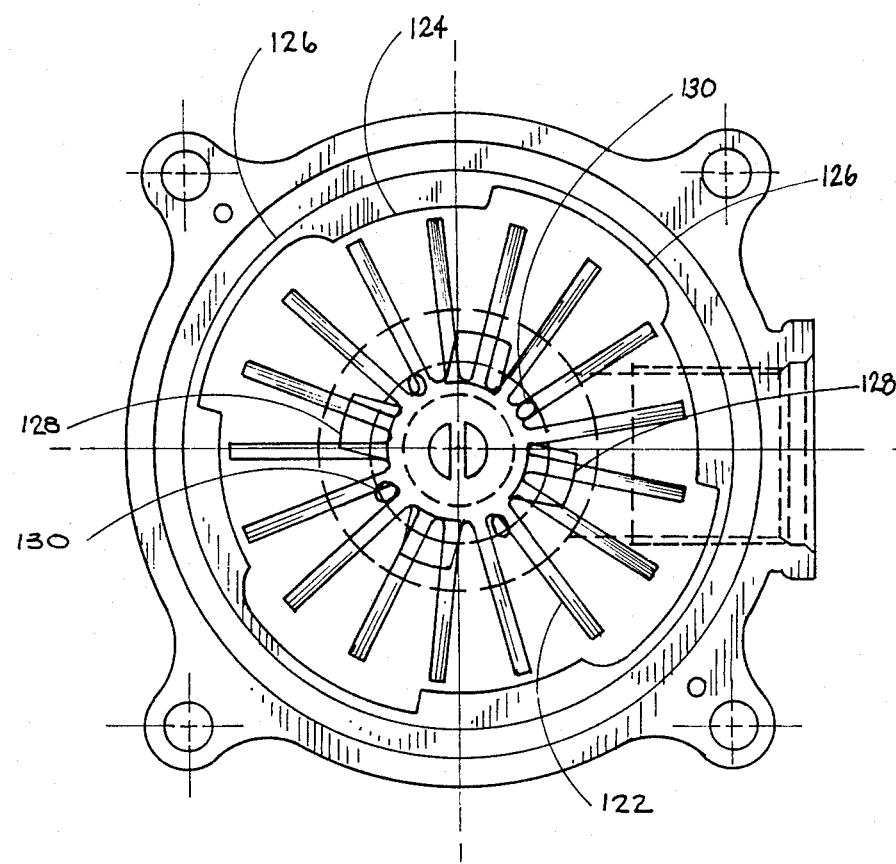
FIG. 11 is a top end sectional view of a liquid ring chamber of an alternative embodiment of the vapor separating and metering pump of the present invention.

An alternative form of the liquid ring section of the invention is shown in FIG. 11. This alternative liquid ring section includes a liquid ring chamber 120 enclosing a liquid ring impeller 122. Liquid ring chamber 120 has a cross sectional profile with four first locations 124 in close proximity to the vanes of the impeller, and four second locations 126 where the chamber wall is disposed from the impeller. In this embodiment, there are four inlet ports 128 for admitting vapor laden fuel into the liquid ring chamber as well as four vapor outlet ports 130 for discharging vapor therefrom. Likewise in this embodiment, there are four outlets for discharging vapor free liquid from the liquid ring chamber. These outlets are arranged in opposed pairs. Each pair is connected separately to one of the inlets of the metering section. This differs from the prior embodiment where both inlets to the metering section are supplied by a common cavity. The advantage of this alternative approach is that in the event the pump is subjected to a lateral acceleration force which exceeds the centrifugal force creating the liquid ring, liquid will still be forced out at least one of the outlets from the liquid ring chamber. This insures that liquid will be delivered to the metering section without interruption avoiding engine stall.

Thus, the new vapor separating and metering pump achieves the above stated objectives, eliminates difficulties encountered in the use of prior devices, solves problems and obtains the desirable results described herein.

In the foregoing description, certain items have been used for brevity, clarity and understanding, however, no unnecessary limitations are to be implied therefrom because such terms are for descriptive purposes and intended to be broadly construed. Moreover, the descriptions and illustrations are by way of examples and the invention is not limited to the details shown and described.

Having described the features, discoveries and principles of the invention, the matter in which it is constructed and operated and the advantages and useful results obtained, the new and useful structures, devices, elements, arrangements, parts, calculations, systems, equipment, operations and relationships are set forth in the appended claims.

I claim:

1. A vapor separating and metering pump for separating vapor from vapor laden liquid and delivering a metered flow of liquid at a flow rate proportional to the rotational velocity of motor means driving said pump, comprising:

a housing including an inlet opening, a metered liquid outlet opening and a vapor outlet opening, said inlet opening in fluid connection with a supply of vapor laden liquid;

a liquid ring chamber enclosed within said housing, said liquid ring chamber in fluid connection with said inlet opening;

a metering chamber enclosed within said housing, said metering chamber having inlet and outlet means for admitting and discharging liquid therefrom respectively, said metering chamber separated from said liquid ring chamber by dividing means inside said housing;

a rotatable shaft extending into said liquid ring and metering chambers, said shaft driven by said motor means;

a liquid ring impeller mounted on said shaft and positioned in said liquid ring chamber, said impeller positioned with respect to said chamber such that upon rotation of the shaft a ring of vapor-free liquid is formed by centrifugal force in at least one pressurized liquid area in said liquid ring chamber and vapor separated from said liquid is positioned adjacent an axis of rotation of said liquid ring impeller in at least one vapor area, said vapor outlet opening in fluid connection with said vapor area;

fluid conduit means through said dividing means for conducting liquid from said pressurized liquid area to the inlet means of said metering chamber; and metering impeller means mounted on said shaft and positioned in said metering chamber, said metering impeller means passing liquid from said inlet means to the outlet means of said metering chamber in proportion to rotational displacement of said metering impeller means;

whereby upon rotation of said shaft by said motor means, said pump separates vapor from said vapor laden liquid and delivers liquid at the metered liquid outlet of said housing at a flow rate proportional to the rotational velocity of said shaft.

2. The apparatus according to claim 1 wherein said motor means is enclosed in a cavity in said housing, said liquid from said outlet means of said metering chamber is discharged into said cavity and said metered fuel outlet opening is in fluid connection with said cavity.

3. The apparatus according to claim 2 and further comprising, rotation indicator means mounted on said shaft and sensor means for sensing the rotation indicator means and generating signals representative of the rotational displacement of said shaft.

4. The apparatus according to claim 3 wherein said rotation indicator means is an indicating member, substantially circular in cross section and comprised of a material having magnetic properties, said member including at least one radially extending protuberance; and wherein said sensor means is a magnetic sensor generating signals responsive to said protuberance moving adjacent said sensor.

5. The apparatus according to claim 4 wherein said liquid ring impeller includes a central hub portion accepting said shaft and a plurality of radially extending vanes, whereby the liquid ring impeller serves as said indicating member.

6. The apparatus according to claim 2 wherein said liquid ring impeller includes a hub portion for accepting said shaft, and a plurality of vanes radially extending from said hub portion, said vanes terminating in outward tips; said liquid ring chamber is bounded by planar walls generally parallel to a plane of rotation of said impeller, and a contour wall generally perpendicular to said plane of rotation, said contour wall including at least one first location wherein said contour wall is adjacent said tips of said vanes and at least one second location wherein said contour wall is disposed from said tips of said vanes, said pressurized liquid areas adjacent said second locations.

7. The apparatus according to claim 6 wherein said contour wall has one first location and one second location and said liquid ring chamber is generally oval shaped in cross section.

8. The apparatus according to claim 6 wherein metering impeller means is generally cam shaped rotor having at least one extending portion in on outer surface, said metering chamber is bounded by a planar wall generally parallel to a plane of rotation of said metering rotor, and a lateral surface generally perpendicular to said plane of rotation, said extending portion of said outer surface being adjacent said lateral surface, at least one fluid repository opening formed between said lateral wall and said outer surface; and further comprising at least one sealing vane extending radially inward from said lateral wall and mounted for radial movement on said housing, a radially inward portion of said sealing vane contacting said outer surface of said rotor, said inlet means of said metering chamber introducing fuel from said liquid ring chamber to said opening on a first side of said sealing vane and said outlet means discharging fuel from said opening on an opposed side of said sealing vane as said extending portion of said rotor approaches said radially inward portion of said sealing vane.

9. The apparatus according to claim 8 wherein the surface of said rotor is a limacon curve.

10. The apparatus according to claim 9 wherein said inlet means of said metering chamber is an inlet opening in said lateral wall on the first side of said sealing vane and said outlet means is an outlet opening in said lateral wall on an opposed side of said sealing vane.

11. The apparatus according to claim 10 wherein said metering chamber has two opposed sealing vanes extending therethrough and said chamber has an inlet opening and outlet opening adjacent each vane.

12. The apparatus according to claim 11 wherein said outer surface of said metering rotor has three equally spaced radially extending portions whereby three openings are formed in said metering chamber between said outer surface of said rotor and said lateral wall.

13. A two-stage vapor separating and metering fuel pump for supplying vapor free fuel to an engine said pump being driven by motor means and supplied with vapor laden fuel from a supply, comprising:

a housing;

dividing means dividing said housing into a liquid ring section and metering section;

a rotatable shaft extending through said liquid ring and metering sections, said shaft being rotatable by a said motor means;

said liquid ring section including a liquid ring chamber, said liquid ring chamber defined by spaced planar liquid ring chamber side walls and a contour wall and being substantially oval in cross section, said shaft extending transversely into said liquid ring chamber and journaled in at least one of said side walls;

a liquid ring impeller positioned and rotatable in said liquid ring chamber, said impeller mounted on said shaft and including a hub portion accepting said shaft and a plurality of radially extending vanes extending from said hub portion, said impeller positioned in said chamber such that an outward tip of a first vane in a first rotational location is adjacent said contour wall and upon rotation of said liquid ring impeller in a first direction said tip is further disposed of said contour wall, said tip being furthest disposed from said wall at a second rotational location;

inlet means for admitting vapor laden fuel into said liquid ring chamber, said inlet means admitting said fuel with respect to said impeller at a position radially outward between said hub and the outward tip and between said first and second rotational locations as said impeller rotates in said first direction from said first location;

unmetered liquid outlet means for discharging vapor free fuel from liquid ring chamber, said outlet means positioned with respect to said impeller adjacent said outward tip and between said second and first rotational locations as said impeller rotates in said first direction from said second location;

vapor outlet means for discharging vapor from said liquid ring chamber, said outlet means positioned with respect to said impeller adjacent said hub portion and between said second and first rotational locations as said impeller rotates in said first direction from said second location;

said metering section of said pump including a metering chamber, said metering chamber defined by spaced planar metering chamber walls and a lateral wall, said chamber being substantially circular in cross section, said shaft extending transversely into said metering chamber and journaled in at least one of said metering chamber walls;

a metering rotor positioned and rotatable in said metering chamber and mounted on said shaft, said metering rotor including an eccentric cam shaped outer face;

at least one sealing vane extending inward into said metering chamber from said contour wall and contacting the outer face of the metering rotor in sealing arrangement therewith, said sealing vane mounted on said metering section for movement in the radial direction;

biasing means biasing said sealing vane toward the outer face of the metering rotor;

fuel inlet means for admitting liquid to said metering chamber, said fuel inlet means being proximate and on a suction side of said sealing vane as the metering rotor rotates in the first direction;

liquid conduit means through said dividing means of said housing for conducting fuel from said unmetered liquid outlet means of said liquid ring chamber to said fuel inlet means of said metering chamber; and metered fuel outlet means for discharging fuel from said metering chamber, said metered fuel outlet means being proximate and on a pressure side of said sealing vane as said rotor rotates in a first direction, whereby upon rotation of said shaft by said motor means, a metered flow of vapor free fuel is delivered at said metered fuel outlet means, said flow being proportional to the rotational velocity of said shaft.

14. The apparatus according claim 13 wherein one of said pair of spaced planar liquid ring chamber walls defining said liquid ring chamber and one of said pair of spaced planar metering chamber walls defining said metering chamber, are a common dividing wall and said liquid conduit means is a fluid passage through said dividing wall.

15. The apparatus according to claim 14 and further comprising:

a rotary indicator mounted on said shaft;

sensor means adjacent said indicator for sensing the passage of said indicator and generating signals representative thereof, whereby said signals are representative of the amount of metered fuel discharged at said metered fuel outlet means.

16. The apparatus according to claim 15 said housing further comprising a motor section including a liquid tight cavity, said cavity enclosing aid motor means, and admitting means for admitting fuel from said metered fuel outlet means into said cavity, and a cavity outlet for discharging fuel from said cavity, whereby metered fuel passes through said cavity to cool said motor means.

17. The apparatus according to claim 16 wherein said motor means includes a variable speed rotatable armature, the rotation of which is controlled by control means and said sensing means is in electrical connection with said control means whereby said control mean determines the amount of fuel being delivered at said cavity outlet from said signals generated by said sensor means.

18. The apparatus according to claim 17 wherein said metering chamber includes a pair of sealing vanes oppositely disposed therein, and said fuel inlet means are a pair of openings through said dividing means in fluid connection with said unmetered fuel outlet mean from said liquid ring chamber.

19. The apparatus according to claim 18 wherein the planar wall of said metering chamber not common with said liquid ring chamber, is a separating wall dividing said metering chamber and said cavity of said motor section, and said metered fuel outlet means is a pair of outlet openings through said separating wall into said cavity.

20. The apparatus according to claim 19 wherein said liquid ring impeller comprised of a material having magnetic properties and said sensor means is a magnetic sensor positioned adjacent to said liquid ring chamber, whereby signals from said sensor are generated in response to said vanes passing adjacent said sensor.

21. The apparatus according to claim 14 wherein said contour wall of said liquid ring chamber includes a plurality of first locations in which said tips of said impeller vanes are adjacent said contour wall, and an equal number of second locations in which said contour wall is disposed away from said tips of said vanes, whereby a plurality of partial liquid rings are formed upon rotation of said liquid ring impeller in said liquid ring chamber, and said vapor fuel inlet means, unmetered liquid outlet means, and vapor outlet means are inlet openings, unmetered fuel outlet openings and the vapor outlet openings respectively for each partial liquid ring.

22. The apparatus according to claim 21 wherein said unmetered liquid outlet means are outlet openings in said liquid ring chamber, said outlet openings arranged in radially opposed pairs, said opposed pairs in fluid connection with said fuel inlet means of said metering section, whereby fluid flow to said metering section is uninterrupted by lateral acceleration of said apparatus.

23. The apparatus according to claim 22 wherein said liquid ring chamber has two pairs of outlet openings equally spaced radially in said chamber.

* * * * *

UNITED STATES PATENT AND TRADEMARK OFFICE
CERTIFICATE OF CORRECTION

PATENT NO. : 4,854,824
DATED : August 8, 1989
INVENTOR(S) : Daniel E. Scholz

It is certified that error appears in the above—identified patent and that said Letters Patent is hereby corrected as shown below:

Claim 16, Patent Column 10, Line 29, change the misspelled word "aid" after the word "enclosing" to the word "said".

Signed and Sealed this

Fifth Day of June, 1990

*Attest:*

HARRY F. MANBECK, JR.

*Attesting Officer*  *Commissioner of Patents and Trademarks*